(12) United States Patent
Zhao et al.

(10) Patent No.: US 10,498,045 B2
(45) Date of Patent: Dec. 3, 2019

(54) HIGH ORDER VORTEX WAVE ANTENNA AND DEVICE AND METHOD FOR GENERATING AND RECEIVING HIGH ORDER VORTEX WAVE

(71) Applicant: XIDIAN UNIVERSITY, Xi'an, Shaanxi (CN)

(72) Inventors: Linjun Zhao, Shaanxi (CN); Hailin Zhang, Shaanxi (CN); Fang Liang, Shaanxi (CN)

(73) Assignee: XIDIAN UNIVERSITY, Xi'an, Shaanxi (CN)

( * ) Notice: Subject to any disclaimer, the term of this patent is extended or adjusted under 35 U.S.C. 154(b) by 0 days.

(21) Appl. No.: 16/085,501

(22) PCT Filed: Jul. 4, 2017

(86) PCT No.: PCT/CN2017/091679
§ 371 (c)(1),
(2) Date: Sep. 14, 2018

(87) PCT Pub. No.: WO2017/202393
PCT Pub. Date: Nov. 30, 2017

(65) Prior Publication Data
US 2019/0296450 A1    Sep. 26, 2019

(30) Foreign Application Priority Data

May 24, 2016 (CN) .......................... 2016 1 0365223

(51) Int. Cl.
*H01Q 21/20* (2006.01)
*H04B 7/08* (2006.01)
*H01Q 3/36* (2006.01)

(52) U.S. Cl.
CPC ............... *H01Q 21/20* (2013.01); *H01Q 3/36* (2013.01); *H04B 7/084* (2013.01)

(58) Field of Classification Search
CPC ........... H01Q 21/20; H01Q 3/36; H04B 7/084
(Continued)

(56) References Cited

U.S. PATENT DOCUMENTS

| 8,274,937 B2 | 9/2012 | Tsai | |
|---|---|---|---|
| 2007/0155331 A1* | 7/2007 | Ylitalo | H01Q 3/26 455/63.4 |
| 2016/0381591 A1* | 12/2016 | Lysejko | H04L 41/0806 370/252 |

FOREIGN PATENT DOCUMENTS

| CN | 101789546 A | 7/2010 |
|---|---|---|
| CN | 104282995 A | 1/2015 |

(Continued)

OTHER PUBLICATIONS

Tu, Zhen et al., "The Fractal Antenna Characteristics Analysis and its Application to MIMO Antenna," Electronic Engineer, vol. 30, No. 11, Nov. 2004 (English abstract on the last page).
(Continued)

*Primary Examiner* — Ayodeji O Ayotunde
(74) *Attorney, Agent, or Firm* — Novick, Kim & Lee, PLLC; Allen Xue

(57) ABSTRACT

A high order vortex wave antenna includes N uniform circle array antennas. The uniform circle array antenna includes M antenna array elements distributed uniformly in axial symmetry on a first circle with a radius of $r_1$. Each antenna array element coincides with an adjacent element after rotating around a center of the first circle by an angle of $2\pi/M$. Centers of the first circles of all uniform circle array antennas are distributed uniformly in axial symmetry on a second circle with a radius of $r_2$. Each uniform circle array antenna coincides with an adjacent uniform circle array antenna after rotating around a center of the second circle by an angle of $2\pi/N$.

8 Claims, 4 Drawing Sheets

(58) Field of Classification Search
USPC .......................................................... 455/63.4
See application file for complete search history.

(56) References Cited

FOREIGN PATENT DOCUMENTS

| | | |
|---|---|---|
| CN | 104518275 A | 4/2015 |
| CN | 105071034 A | 11/2015 |
| CN | 105098335 A | 11/2015 |
| CN | 106059675 A | 10/2016 |
| GB | 2410130 A | 7/2005 |

OTHER PUBLICATIONS

Li, Qinghua et al., "The Outline of Electromagnetic Vortex," Proceedings of 2015 National Conference on Microwave and Millimeter Waves, May 30, 2015, pp. 651-653.

Yin, Lixin, "Fractal Array Antenna Research," Electronic Technology & Information Science, China Master's Theses Full-Text Database, No. 11, Nov. 15, 2010.

* cited by examiner

HIGH ORDER VORTEX WAVE ANTENNA AND DEVICE AND METHOD FOR GENERATING AND RECEIVING HIGH ORDER VORTEX WAVE

TECHNICAL FIELD

The present invention relates to the field of wireless communication signal processing technology, particularly to a high order vortex wave antenna and a device and a method for generating and receiving high order vortex wave.

BACKGROUND

For a practitioner of communication science and technology, seeking a novel method to increase channel capacity of a system without increased bandwidth is a subject for ever. At present, there are established technologies for improving channel capacities of conventional wireless communication systems. People are resorting to non-conventional electromagnetic wave field for technical breakthroughs. According to classical electrodynamics theories, vortex electromagnetic waves of same frequency and different modes may share channels at the same time. Bo Thidé and his Italy colleague team have demonstrated the experiment of independent information transmission at the same time in the same frequency with vortex wave and planar wave, which verified the capability of improving channel capacity of a wireless system with vortex wave, providing a new way for further increasing channel capacity of existing communication systems.

In order to apply vortex wave technology to the radio frequency band, continuous efforts have been made. Main research achievements reported in publications in the art are as follows. In 2010, S. M. Mohammadi and Bo Thidé et al. proposed a method for generating vortex waves based on a ring array antenna. In 2011, F. Tamburini et al. experimentally verified a method for generating vortex waves with an aperture antenna having an 8 order spin ladder-shaped reflector. In 2012, Alan Tennant et al. verified by simulation the method for generating vortex waves o independent modes at a plurality of frequencies at th same time using a TSA (Time Switched Array) ring array. In 2013, Qiang Bai and Tennant A et al. simulated a method for generating vortex waves with an 8 element phased microstrip uniform circular array. In 2014, Qiang Bai et al. verified experimentally the generation of vortex waves with 8-element phased microstrip uniform circular array antenna. In 2014, Palacin B et al. studied the application of 8×8 Butler matrix in th 8-element uniform circular array antenna and generated 8 vortex waves of independent modes at the same carrier frequency at the same time. In 2015, Wei Wen-long et al. designed a ring phase shifter with a carrier frequency of 2.5 GHz for a 4-element phased microstrip uniform circular array vortex EM antenna. In 2015, Gui Liang-qi et al. from Huazhong University of Science and Technology simulated the method for generating vortex waves with grooved circular array antenna.

As reported in prior art publications, the larger the number of available modes for the vortex waves in a communication system is, the more significant the capacity improvement for the system is, and accordingly the larger the physical dimensions required for the system receiving/transmitting antennas, which is adverse to the movement and maintenance of the communication system. Therefore, studying technologies for generating high order vortex waves with antennas of relatively small physical dimensions has theoretical and practical significance. at present, there are rare reports about the method for generating and receiving high order multimode vortex waves in wireless communication field.

SUMMARY

The object of the present invention is to provide a high order vortex wave antenna and a device and method for generating and receiving high order vortex waves to address the technical problem of difficulty of generating and receiving high order vortex waves in prior art.

The technical solution of the present invention is a high order vortex wave antenna characterized by comprising N uniform circle array antennas.

Said uniform circle array antenna comprises M antenna array elements distributed uniformly in axial symmetry on a first circle with a radius of $r_1$, and each antenna array element coincides with an adjacent element after rotating around a center of the first circle by an angle of $2\pi/M$.

Centers of the first circles of all uniform circle array antennas are distributed uniformly in axial symmetry on a second circle with a radius of $r_2$, and each uniform circle array antenna coincides with an adjacent uniform circle array antenna after rotating around a center of the second circle by an angle of $2\pi/N$.

Further, a spacing between two adjacent elemental antennas is greater than $\lambda/2$, and a spacing between two adjacent uniform circle array antennas is greater than $\lambda/2$, wherein $\lambda$ is a wavelength of carrier wave.

The present invention further provides a device for generating high order vortex waves characterized by comprising the high order vortex wave antenna as described above, a parameter controller, a N×M phase shifter and a M×N phase shifter; wherein said parameter controller is configured to control signal input, grouping and output of the N×M phase shifter and the M×N phase shifter; said N×M phase shifter is configured to phase shift the input signals and output phase shifted results to the M×N phase shifter, said M×N phase shifter is configured to phase shift signals transmitted by the N×M phase shifter and output them to the high order vortex wave antenna, and said high order vortex wave antenna uses the signals transmitted by the M×N phase shifter as stimulation to generate high order vortex waves.

The present invention further provides a method for generating high order vortex waves, characterized by comprising steps of:

1) phase shifting, by the N×M phase shifter, the input signals $A_n^{(m)}(t)$ to generate signals $s_n^{(m)}(t)$; wherein n is a count of uniform circle array antennas in the high order vortex wave antennas, n=0, 1, 2 ... (N−1); in is a count of antenna array elements in the uniform circle array antenna, m=0, 1, 2 ... (M−1);

2) grouping signals $s_n^{(m)}(t)$ and outputting them to the N×N phase shifter;

3) phase shifting, by the M×N phase shifter, signals $s_n^{(m)}(t)$, generating and outputting signals $y_n^{(m)}(t)$; and 4) using the signals $y_n^{(m)}(t)$ as a stimulation for a $m^{th}$ antenna array element on a $n^{th}$ uniform circle array antenna in the high order vortex wave antenna to generate high order vortex wave signals.

Further, the stimulation for the $m^{th}$ antenna array element on the $n^{th}$ uniform circle array antenna in the high order vortex wave antenna is:

$$y_n^{(m)}(t) = \sum_{k=0}^{N-1} \sum_{p=0}^{M-1} \dot{A}_n^{p,k}(t) e^{j\left(p \cdot \frac{2\pi}{M} m + ((k+p))_N \cdot \frac{2\pi}{N} \cdot n\right)}$$

wherein, p is a mode of the vortex waves generated by the uniform circle array antenna, p=0, 1, 2 ... (N−1); k is a mode of the vortex waves generated by the high order vortex wave antenna, k=0, 1, 2 ... (M−1); $\dot{A}_n^{p,k}(t)$ is modulated information carried by a second order vortex wave generated by loading a p mode vortex signal of the uniform circle array antenna to a k mode vortex signal of the high order vortex wave antenna; and $((k+p))_N$ is k+p mod N; The present invention further provides a high order vortex wave receiving device characterized by comprising the high order vortex wave antenna as described above, a mode controller, a N mode separator and a M mode separator; wherein said mode controller is configured to control signal inputting, grouping and outputting of the N mode separator and the M mode separator; said high order vortex wave antenna is configured to receive high order vortex waves and input element responses to the N mode separator in parallel, said N mode separator is configured to subject the input signals to N mode separation and output separated results to the M mode separator, and said M mode separator is configured to subject signals transmitted by the N mode separator to M mode separation and output separated results to obtain modulated information carried by the high order vortex waves.

The present invention further provides a method for receiving high order vortex waves, characterized by comprising steps of:

1) receiving, by a high order vortex wave antenna, high order vortex wave signals, and generating, by a $m^{th}$ antenna array element on a $n^{th}$ uniform circle array antenna, response signals $\tilde{y}_n^{(m)}(t)$;

2) subjecting, by a N mode separator, signals $\tilde{y}_n^{(m)}(t)$ to N mode separation to obtain signals $\tilde{s}_n^{(m)}(t)$;

3) grouping signals $\tilde{s}_n^{(m)}(t)$ and inputting them to a M mode separator;

4) subjecting, by a M mode separator, signals $\tilde{s}_n^{(m)}(t)$ to M mode separation to obtain signals $\tilde{A}_n^{(m)}(t)$ and obtaining, from signals $\tilde{A}_n^{(m)}(t)$, modulated information carried by the high order vortex waves.

Further, the response signal generated by the $m^{th}$ antenna array element on the $n^{th}$ uniform circle array antenna in the high order vortex wave antenna is:

$$\tilde{y}_n^{(m)}(t) = H \cdot \sum_{k=0}^{N-1} \sum_{p=0}^{M-1} \dot{A}_n^{p,k}(t) e^{j(p \cdot \frac{2\pi}{M} m + ((k+p))_N \cdot \frac{2\pi}{N} \cdot n)}$$

wherein, H is a space transmission channel function of high order vortex wave signals, p is a mode of the vortex waves generated by the uniform circle array antenna, p=0, 1, 2 ... (N−1); k is a mode of the vortex waves generated by the high order vortex wave antenna, k=0, 1, 2 ... (M−1); $\dot{A}_n^{p,k}(t)$ is modulated information carried by a second order vortex wave generated by loading a p mode vortex signal of the uniform circle array antenna to a k mode vortex signal of the high order vortex wave antenna; and $((k+p))_N$ is k+p mod N.

The beneficial effect of the present invention is as follows. The present invention combines the uniform circle array (UCA) structure with the fractal nesting theory and proposes a UCA rotationally fractally nested high order vortex wave antenna element layout structure. A uniform circle array antenna with a radius of $r_1$ and the number of elements of M may generate M vortex signals of different modes, and a high order vortex wave antenna with a radius of $r_2$ using N uniform circle array antennas as elements may further generate N vortex signals of different modes. Modulating the multi-mode vortex waves generated by the uniform circle array antenna onto one mode of the multi-mode vortex signals generated by the uniform circle array antenna may generate high order vortex wave signals. Accordingly, spatial high order vortex wave signals are received with the high order vortex wave antenna of rotationally and fractally nested structure and responses are generated on N uniform circle array antennas. Separated reduced order vortex wave information corresponding to elements is grouped according to the element relationship. Then modulated information carried on high order vortex waves is separated from the reduced order vortex waves group by group.

Figure 1:
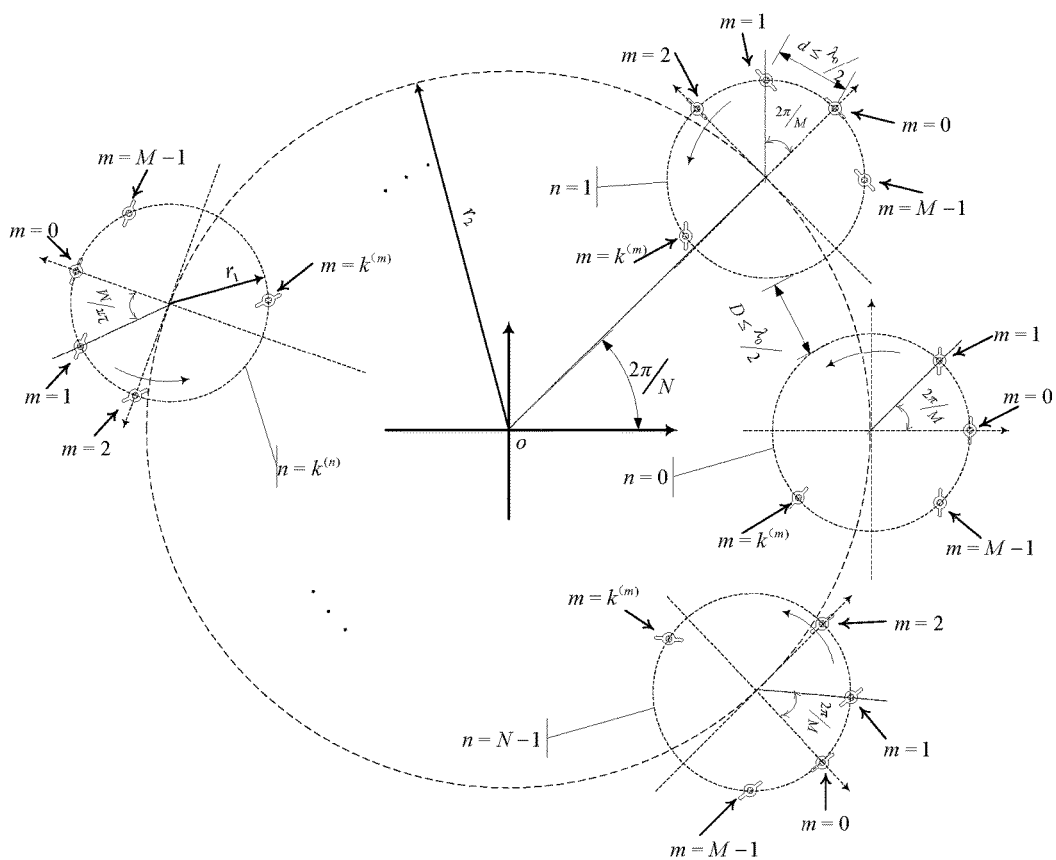
FIG. 1 is a structure diagram of a high order vortex wave antenna according to the present invention.

Reference numerals: 1—high order vortex wave antenna, 2—N×m phase shifter, 3—M×N phase shifter, 4—parameter controller, 5—N mode separator, 6—M mode separator, 7—mode controller.

DETAILED DESCRIPTION

The the present invention provides a rotationally, fractally nested high order vortex wave transmitting and receiving antenna layout structure facing an uniform circle array (UCA) and provides a method for generating and receiving and separating high order multi-mode vortex waves with UCA rotationally fractally nested high order vortex wave antenna and a device for implementing the same.

Referring to FIG. 1, the high order vortex wave antenna of the present invention is of a UCA nested structure without mutual crossing formed of N copies of a uniform circle array (UCA) antenna with a radius of $r_1$ an element spacing d≤2≤λ/2 (λ, being the carrier wave's wavelength) and the number of elements of A/by distributing them on a circle with a radius of $r_2$ with equal intervals after rotating them in the same direction by $$\alpha_n = \frac{2\pi \cdot n}{N} (n = 0, 1, \ldots, N-1)$$

sequentially, and wherein the minimum value of spacing between different elements of two UCAs with the radius of $r_1$ on the circle with the radius of $r_2$ is greater than or equal to λ/2, and the high order vortex wave transmitting and receiving antenna structure is characterized by rotationally fractally nested UCA.

Denoting the UCA with radius of $r_1$ in the antenna as $UCA_n$ n=0, 1, . . . , N−1) and establishing a frame of reference from the geometric center of the antenna, the $UCA_n$ n=0, 1, . . . , N−1) are on a circle with radius of $r_2$ and rotated by $$\alpha_n = \frac{2\pi \cdot n}{N} (n = 0, 1, \ldots, N-1)$$

one by one, then the element No. 0 of $UCA_n$ n=0, 1, ..., N-1) is on a circle with radius of $r_1+r_2$, the element No. 1 of $UCA_n$ n=0, 1, ..., N-1) is also on the same circle, and so on, and finally the element No. M-1 of $UCA_n$ n=0, 1, ..., N-1) is also on the same circle.

Figure 2:
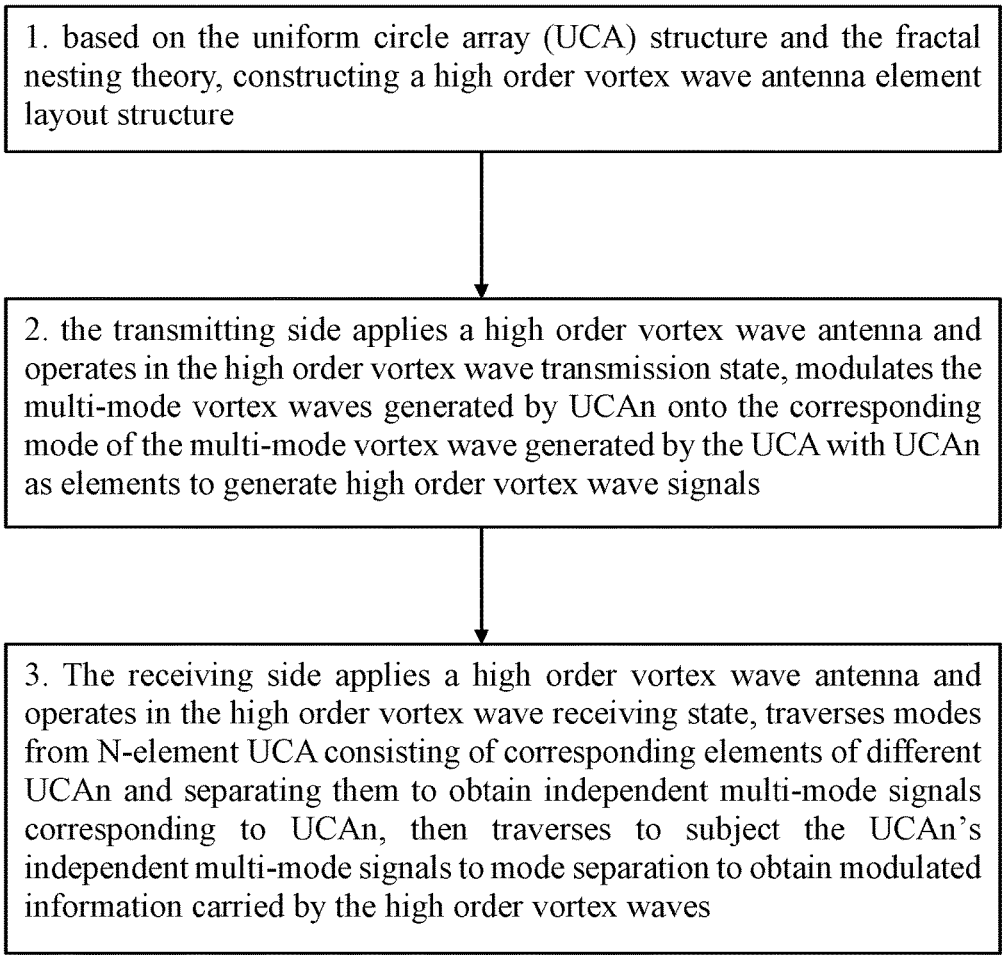
FIG. 2 is an general view of a method for generating and receiving high order vortex waves according to the present invention.

Referring to FIG. 2, the method for generating multi-mode high order signals at the receiving side of the rotationally fractally nested high order vortex wave facing UCA is to generate high order vortex wave signals with UCA rotationally fractally nested antenna. It is known from the UCA rotationally fractally nested antenna element layout structure, a UCA with a radius of $r_1$ and the number of elements of m may generate m vortex signals of different modes by itself; taking a UCA with a radius of $r_1$ and the number of elements of M as an element, a UCA with a radius of $r_2$ may then generate N vortex signals of different modes; modulating the multi-mode vortex waves generated by the UCA with the radius of $r_1$ onto one mode of the multi-mode vortex signals generated by the UCA with a radius of $r_2$ would generate the high order vortex wave signals described in the present invention.

The method for receiving multi-mode high order vortex wave signals at the receiving side of rotationally fractally nested high order vortex waves facing UCA is to receive spatial high order vortex wave signals using UCA rotationally fractally nested antenna. According to the UCA rotationally fractally nested high order vortex wave antenna array layout structure, responses of the same element serial numbers are obtained sequentially in N UCAs with the radius of $r_1$ and the number of elements of M on the radius of $r_2$ firstly, and the obtained responses are subjected to N-point spatial orthogonal transformation which can extract reduced order vortex wave information of corresponding elements that are grouped according to their relationship with corresponding elements of the N UCAs with a radius of $r_1$ and the number of elements of the M, then the reduced order vortex wave information is subjected to M-point spatial orthogonal transformation according to groups respectively, which may extract the modulated information carried on the high order vortex waves.

Figure 3:
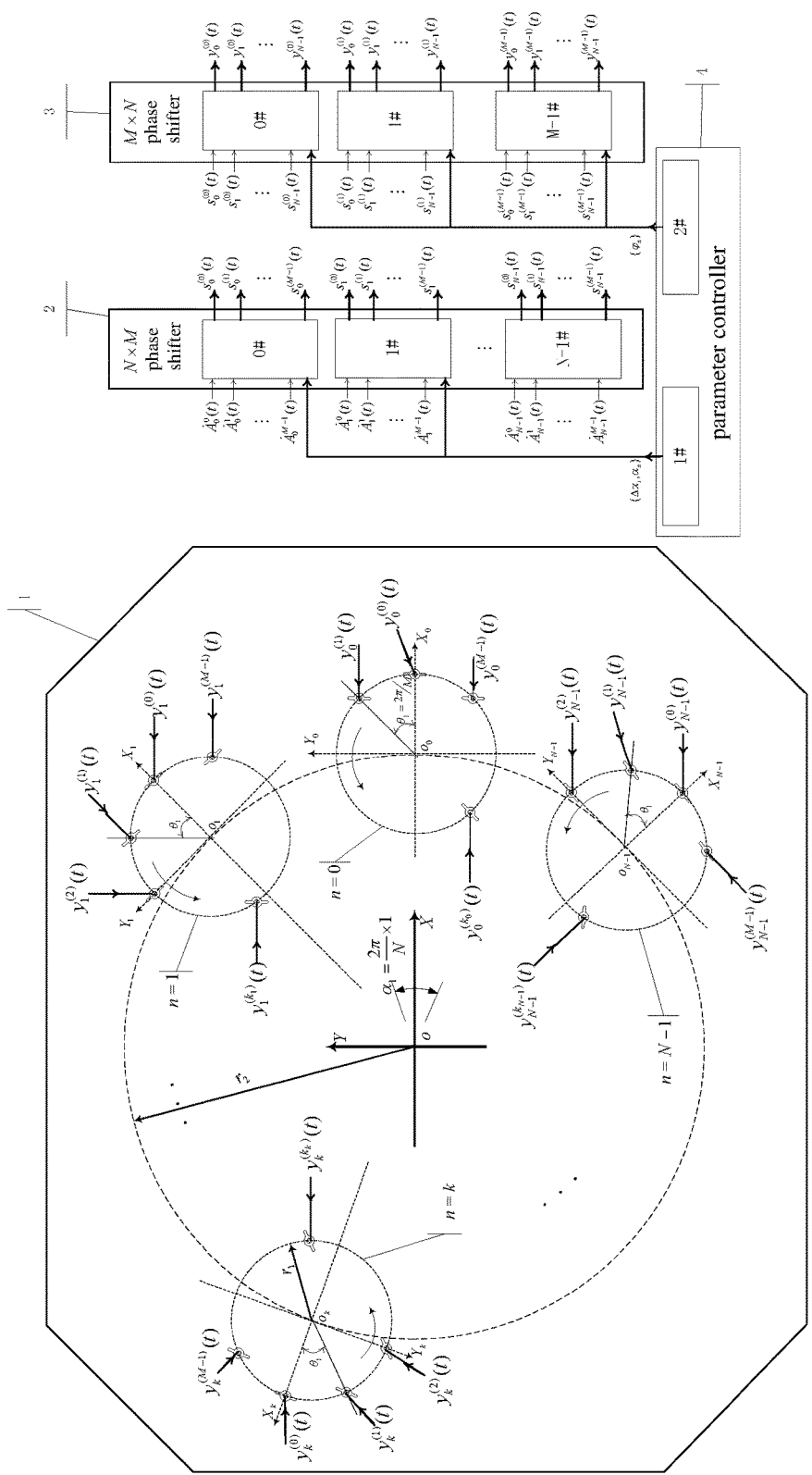
FIG. 3 is a principle diagram of a high order vortex wave generating device according to the present invention.

Referring to FIG. 3, a frame of reference is established based on the geometric center of the high order vortex wave antenna 1 and denoted as XOY, and frames of reference are established based on respective centers of $UCA_n$, (n=0, 1, ..., N-1) and denoted as XOY n=0, 1, ..., N-1), and XOY is a translated rotation of XOY (with a rotation angle of $$\alpha_n = \frac{2\pi \cdot n}{N},$$

n=0, 1, ..., N-1). Under the frame of reference XOY, $UCA_n$, generates high order multi-mode vortex wave signals:

$$y_l(t, \beta, \alpha) = \sum_{k=0}^{N-1} \sum_{p=0}^{M-1} \dot{A}_n^{p,k}(t) e^{j(p \cdot \beta + ((k+p))_N \cdot \alpha)} \quad (1)$$

wherein $\dot{A}_n^{p,k}(t)$ (k=0, 1, ..., N-1, p=0, 1, ..., M-1) is the modulated information carried by the second order vortex waves generated by loading $UCA_n$'s p mode vortex signals onto the k mode vortex signals of the UCA with $UCA_n$, as elements, p is the vortex wave mode generated by $UCA_n$, (n=0, 1, ..., N-1) (the number of elements of $UCA_n$, is M, therefore p=0, 1, ..., M-1), k is the vortex wave mode generated by the UCA consisting of $UCA_n$, (n=0, 1, ..., N-1) as elements, α is the azimuthal angle of the propagation direction of the vortex waves generated by the UCA with $UCA_n$, (n=0, 1, ..., N-1) as elements, β is the azimuthal angle of the propagation direction of the vortex waves generated by $UCA_n$, (n=0, 1, ..., N-1), and $((k+p))_N$ is k+p mod N;

The stimulation corresponding to element $UCA_n^{(m)}$ (n=0, 1, ..., N-1, m=0, 1, ..., M-1) in the high order vortex wave UCA rotationally fractally nested antenna is $$y_n^{(m)}(t) = \sum_{k=0}^{N-1} \sum_{p=0}^{M-1} \dot{A}_n^{p,k}(t) e^{j(p \cdot \frac{2\pi}{M} m + ((k+p))_N \cdot \frac{2\pi}{N} \cdot n)} \quad (2)$$

In FIG. 3, using $y_n^{(m)}(t)$ as the stimulation for element $UCA_n^{(m)}$, n=0, 1, ... N-1, ..., N-1, m=0, 1, ..., M-1) may generate the high order vortex wave signals described in the present invention. The vortex waves that may be generated with the antenna according to the present invention is of the second order and the maximum value of the generated signals is NM.

Figure 4:
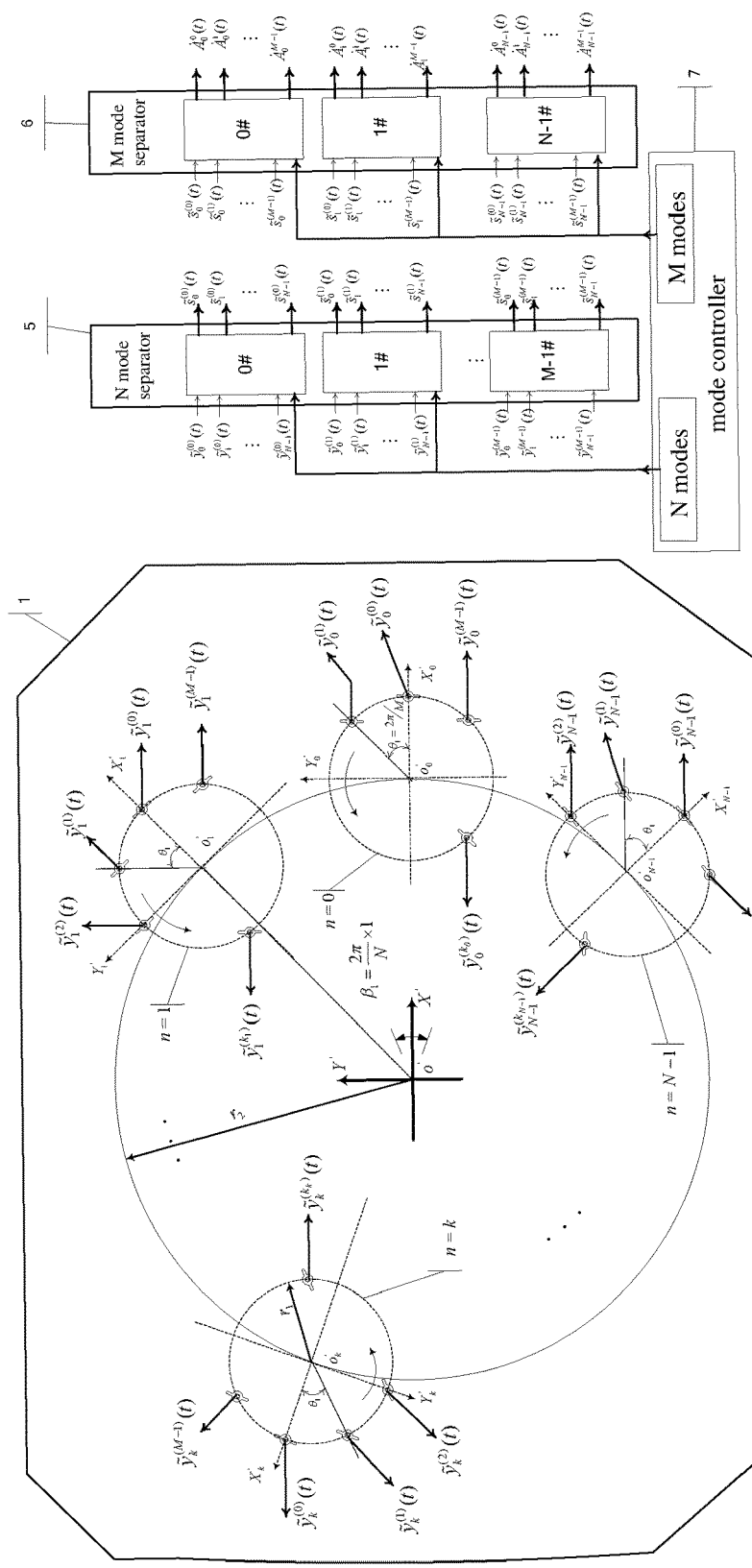
FIG. 4 is a principle diagram of a high order vortex wave receiving device according to the present invention.

The method for separating multi-mode high order vortex waves is as follows. The two communicating parties apply the antenna described in the present invention both of which operate in the high order vortex wave TX/RX mode and have their TX/RX antennas aligned in parallel. As shown in FIG. 4, in the plane in which the receiving antenna elements are located, a frame of reference, denoted as XOY', is established based on the geometric center of the antenna, and independent frames of reference denoted as $XOY_n'$=0, 1, ..., N-1) respectively are established based on respective centers of $UCA_n$ n=0, 1, ..., N-1) and $XOY_n'$ is XOY's translation and rotation $$\alpha_n = \frac{2\pi \cdot n}{N} (n = 0, 1, ..., N-1),$$

and responses of individual elements are $\tilde{y}_n^{(i)}(t)$ (i=0, 1, ..., M-1, n=0, 1, ..., N-1). $\{\tilde{y}_0^{(0)}, \tilde{y}_1^{(0)}(t), ..., \tilde{y}_{N-1}^{(0)}(t)\}$ is subjected to FFT spatial orthogonal separation to obtain $\{\tilde{s}_0^{(0)}(t), \tilde{s}_1^{(0)}(t), ..., \tilde{s}_{N-1}^{(0)}(t)\}$, $\{\tilde{y}_0^{(1)}(t), \tilde{y}_1^{(1)}(t), ..., \tilde{y}_{N-1}^{(1)}(t)\}$ is subjected to FFT spatial orthogonal separation to obtain $\{\tilde{s}_0^{(1)}(t), \tilde{s}_1^{(1)}(t), ..., \tilde{s}_{N-1}^{(1)}(t)\}$ similarly, and so on, until $\{\tilde{y}_0^{(M-1)}(t), \tilde{y}_1^{(M-1)}(t), ..., \tilde{y}_{N-1}^{(M-1)}(t)\}$ is subjected to FFT spatial orthogonal separation to obtain $\{\tilde{s}_0^{(M-1)}(t), \tilde{s}_1^{(M-1)}(t), ..., \tilde{s}_{N-1}^{(M-1)}(t)\}$. Then $\{\tilde{s}_n^{(0)}(t), \tilde{s}_n^{(1)}(t), ..., \tilde{s}_n^{(M-1)}(t)\}$ is subjected to FFT spatial orthogonal separation to obtain modulated information carried by $UCA_n$'s M mode vortex wave signals. Traversing n=0, 1, ..., N-1 may separate all modulated information carried by high order vortex waves from $\{\tilde{s}_n^{(0)}(t), \tilde{s}_n^{(1)}(t), ..., \tilde{s}_n^{(M-1)}(t)\}$.

The method for separating high order vortex wave signals includes the following steps.

(a) Received signals are denoted as $\tilde{y}(t)$, then it holds $$\tilde{y}(t) = H \cdot \sum_{k=0}^{N-1} \sum_{p=0}^{M-1} \dot{A}_n^{p,k}(t) e^{j(p \cdot \beta + ((k+p))_N \cdot \alpha)} \quad (3)$$

wherein k=0, 1, ..., N-1, p=0, 1, ..., M-1 and H are channel functions;

(b) The high order vortex wave signals received by the receiving antenna element $UCA_n^{(m)}$ (n=0, 1, ..., N−1, =0, 1, ..., M−1) are $$\tilde{y}_n^{(m)}(t) = H \cdot \sum_{k=0}^{N-1} \sum_{p=0}^{M-1} \dot{A}_n^{p,k}(t) e^{j\left(p \cdot \frac{2\pi}{M} m + ((k+p))_N \cdot \frac{2\pi}{N} \cdot n\right)} \quad (4)$$

wherein n=0, 1, ..., N−1, m=0, 1, ..., M−1;

(c) $\{\tilde{y}_0^{(m)}(t), \tilde{y}_1^{(m)}(t), ..., \tilde{y}_{N-1}^{(m)}(t)\}$ is subjected to N mode separation and it comes that $$\tilde{s}_n^{(m)}(t) = \sum_{n=0}^{N-1} \tilde{y}_n^{(m)}(t) \cdot e^{-j \cdot n \cdot \frac{2\pi}{N} \cdot k} \quad (5)$$

wherein m=0, 1, M−1, k=0, 1, ..., N−1;

(d) $\{\tilde{s}_n^{(0)}(t), \tilde{s}_n^{(1)}(t), ..., \tilde{s}_n^{(M-1)}(t)\}$ is subjected to M mode separation and it comes that $$\dot{A}_n^p(t) = \frac{1}{H} \sum_{p=0}^{M-1} \tilde{s}_n^{(m)}(t) \cdot e^{-j \cdot p \cdot \frac{2\pi}{M} \cdot m} \quad (6)$$

wherein p=0, 1, ..., M−1, $\dot{A}_n^p(t)$ obtains information (containing amplitude and phase) from the p mode vortex signals of $UCA_n$ n=0, 1, ..., N−1) and traversing n=0, 1, ..., N−1 may obtain all modulated information carried by the high order vortex waves described in the present invention.

For those skilled in the art, it is possible to make various corresponding changes and modifications according to the above-mentioned technical solution and concepts while all these changes and modifications should be encompassed in the scope of the claims of the present invention.

The invention claimed is:

1. A high order vortex wave antenna characterized by comprising N uniform circle array antennas;

wherein said uniform circle array antenna comprises M antenna array elements distributed uniformly in axial symmetry on a first circle with a radius of $r_1$, and each antenna array element coincides with an adjacent element after rotating around a center of the first circle by an angle of $2\pi/M$; and centers of the first circles of all uniform circle array antennas are distributed uniformly in axial symmetry on a second circle with a radius of $r_2$, and each uniform circle array antenna coincides with an adjacent uniform circle array antenna after rotating around a center of the second circle by an angle of $2\pi/N$.

2. The high order vortex wave antenna of claim 1, characterized in that a spacing between two adjacent elemental antennas is greater than $\lambda/2$, and a spacing between two adjacent uniform circle array antennas is greater than $\lambda/2$, wherein $\lambda$ is a wavelength of carrier wave.

3. A device for generating high order vortex waves characterized by comprising the high order vortex wave antenna of claim 1, a parameter controller, a N×M phase shifter and a M×N phase shifter; wherein said parameter controller is configured to control signal input, grouping and output of the N×M phase shifter and the M×N phase shifter; said N×M phase shifter is configured to phase shift the input signals and output phase shifted results to the M×N phase shifter, said M×N phase shifter is configured to phase shift signals transmitted by the N×M phase shifter and output them to the high order vortex wave antenna, and said high order vortex wave antenna uses the signals transmitted by the M×N phase shifter as stimulation to generate high order vortex waves.

4. A method for generating high order vortex waves, characterized by comprising steps of:

1) phase shifting, by the N×M phase shifter, the input signals $A_n^{(m)}(t)$ to generate signals $s_n^{(m)}(t)$; wherein n is a count of uniform circle array antennas in the high order vortex wave antennas, n=0, 1, 2 ... (N−1); m is a count of antenna array elements in the uniform circle array antenna, m=0, 1, 2 ... (M−1);

2) grouping signals $s_n^{(m)}(t)$ and outputting them to the M×N phase shifter;

3) phase shifting, by the M×N phase shifter, signals $s_n^{(m)}(t)$, generating and outputting signals $y_n^{(m)}(t)$; and 4) using the signals $y_n^{(m)}(t)$ as a stimulation for a $m^{th}$ antenna array element on a $n^{th}$ uniform circle array antenna in the high order vortex wave antenna to generate high order vortex wave signals.

5. The method for generating high order vortex waves of claim 4, characterized in that the stimulation for the $m^{th}$ antenna array element on the $n^{th}$ uniform circle array antenna in the high order vortex wave antenna is:

$$y_n^{(m)}(t) = \sum_{k=0}^{N-1} \sum_{p=0}^{M-1} \dot{A}_n^{p,k}(t) e^{j\left(p \cdot \frac{2\pi}{M} m + ((k+p))_N \cdot \frac{2\pi}{N} \cdot n\right)}$$

wherein, p is a mode of the vortex waves generated by the uniform circle array antenna, p=0, 1, 2 ... (N−1); k is a mode of the vortex waves generated by the high order vortex wave antenna, k=0, 1, 2 ... (M−1); $\dot{A}_n^{p,k}(t)$ is modulated information carried by a second order vortex wave generated by loading a p mode vortex signal of the uniform circle array antenna to a k mode vortex signal of the high order vortex wave antenna; and $((k+p))_N$ is k+p mod N.

6. A high order vortex wave receiving device characterized by comprising the high order vortex wave antenna of claim 1, a mode controller, a N mode separator and a M mode separator; wherein said mode controller is configured to control signal inputting, grouping and outputting of the N mode separator and the M mode separator; said high order vortex wave antenna is configured to receive high order vortex waves and input element responses to the N mode separator in parallel, said N mode separator is configured to subject the input signals to N mode separation and output separated results to the M mode separator, and said M mode separator is configured to subject signals transmitted by the N mode separator to M mode separation and output separated results to obtain modulated information carried by the high order vortex waves.

7. A method for receiving high order vortex waves, characterized by comprising steps of:

1) receiving, by a high order vortex wave antenna, high order vortex wave signals, and generating, by a $m^{th}$ antenna array element on a $n^{th}$ uniform circle array antenna, response signals $\tilde{y}_n^{(m)}(t)$;

2) subjecting, by a N mode separator, signals $\tilde{y}_n^{(m)}(t)$ to N mode separation to obtain signals $\tilde{s}^{(m)}(t)$;

3) grouping signals $\tilde{s}_n^{(m)}(t)$ and inputting them to a M mode separator;

4) subjecting, by a M mode separator, signals $\tilde{s}_m^{(m)}(t)$ to M mode separation to obtain signals $\tilde{A}_n^{(m)}(t)$ and obtaining, from signals $\tilde{A}_n^{(m)}(t)$ modulated information carried by the high order vortex waves.

8. The method for receiving high order vortex waves of claim 7, characterized in that response signal generated by the $m^{th}$ antenna array element on the $n^{th}$ uniform circle array antenna in the high order vortex wave antenna is:

$$\tilde{y}_n^{(m)}(t) = H \cdot \sum_{k=0}^{N-1} \sum_{p=0}^{M-1} \dot{A}_n^{p,k}(t) e^{j\left(p \cdot \frac{2\pi}{M} m + ((k+p))_N \cdot \frac{2\pi}{N} \cdot n\right)}$$

wherein, H is a space transmission channel function of high order vortex wave signals, p is a mode of the vortex waves generated by the uniform circle array antenna, p=0, 1, 2 . . . (N−1); k is a mode of the vortex waves generated by the high order vortex wave antenna, k=0, 1, 2 . . . (M−1); $\dot{A}_n^{p,k}(t)$ is modulated information carried by a second order vortex wave generated by loading a p mode vortex signal of the uniform circle array antenna to a k mode vortex signal of the high order vortex wave antenna; and $((k+p))_N$ is k+p mod N.

* * * * *